Feb. 4, 1947.  E. R. ZADEMACH ET AL  2,415,201
ROTARY CONVEYER
Filed May 14, 1943  4 Sheets-Sheet 1

INVENTOR.
Erich R. Zademach and
William W. Clarke
BY Moses & Nolte
ATTORNEYS

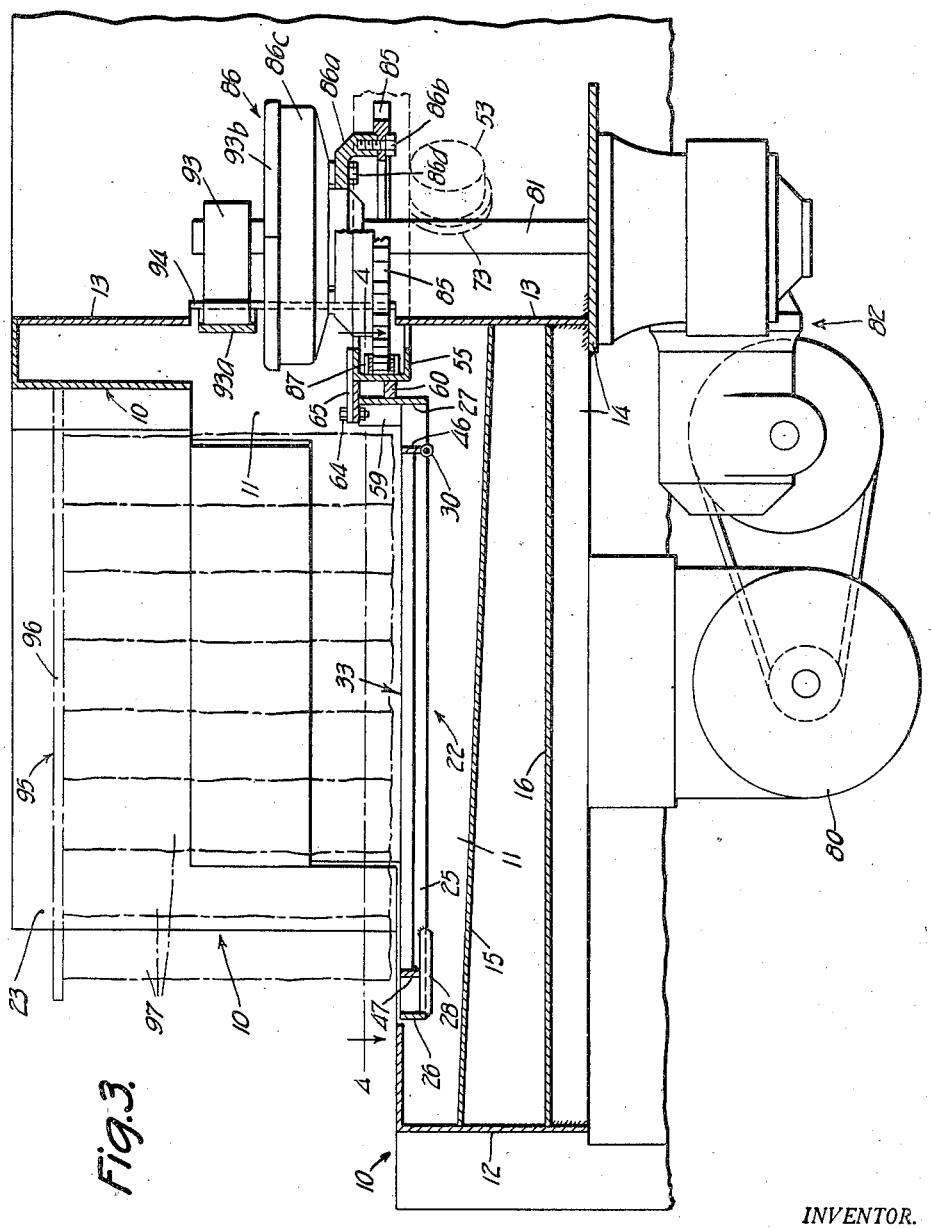

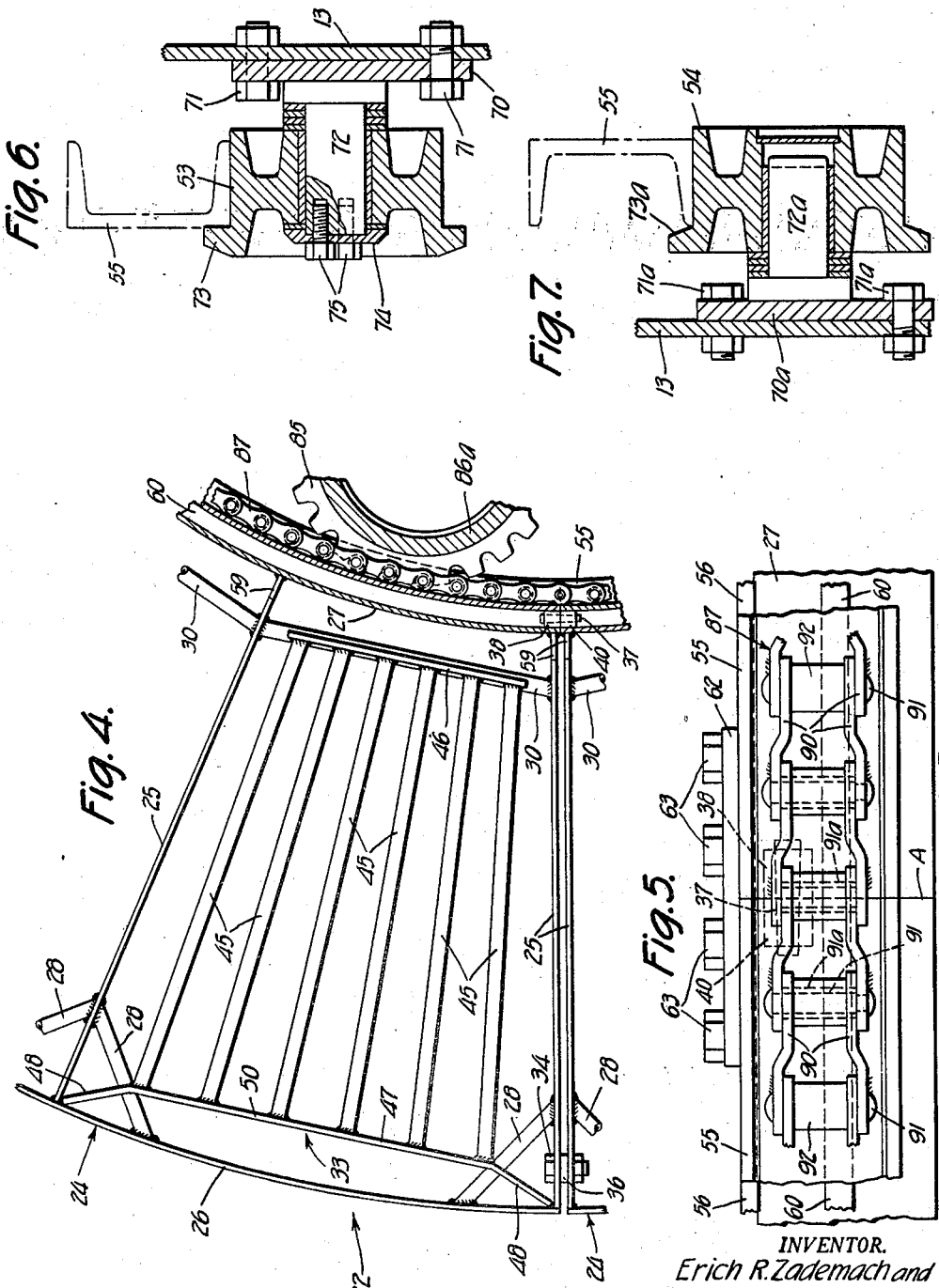

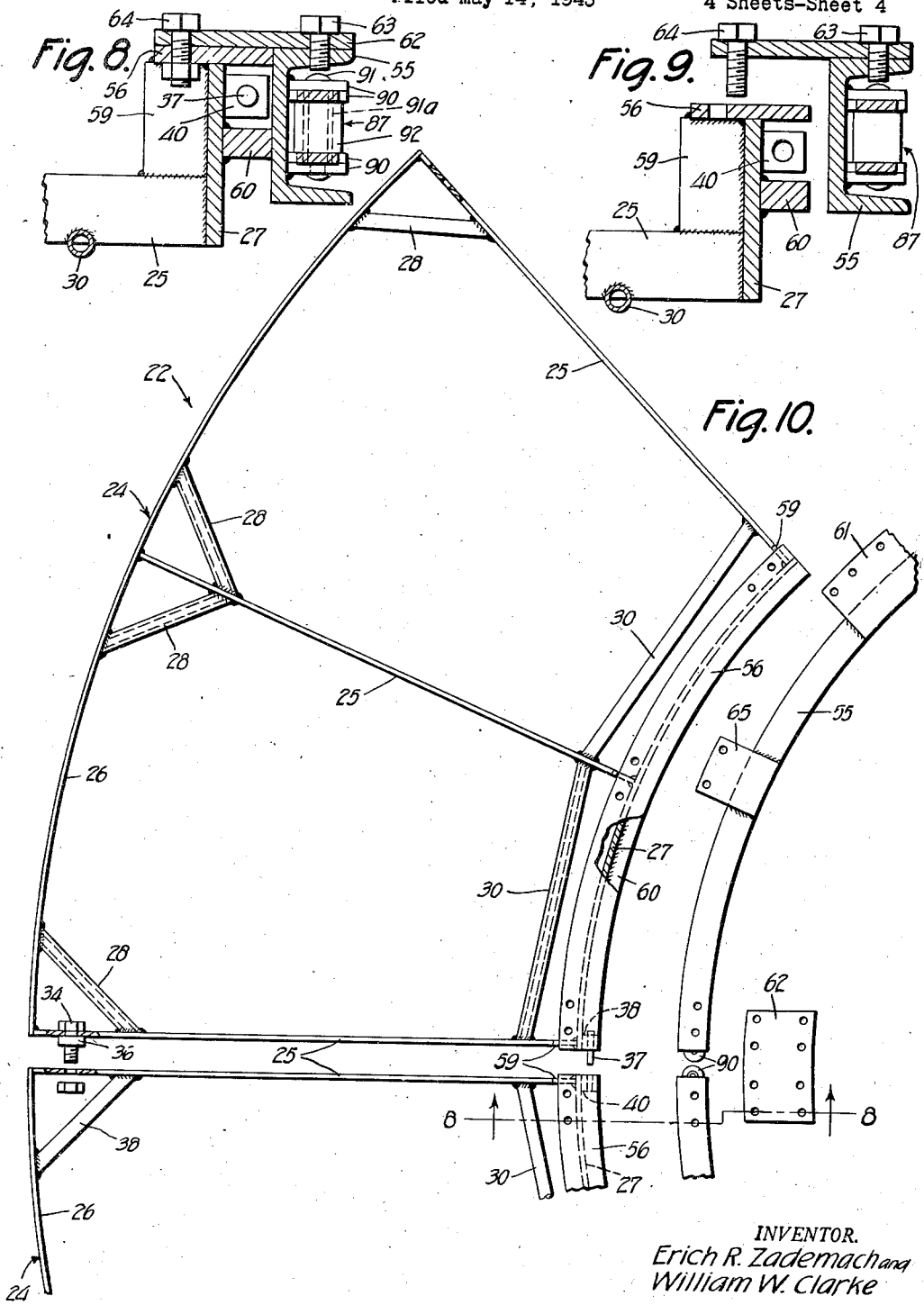

Patented Feb. 4, 1947

2,415,201

UNITED STATES PATENT OFFICE 2,415,201

ROTARY CONVEYER

Erich R. Zademach, Hillside, and William W. Clarke, Summit, N. J., assignors to Metalwash Machinery Company, Irvington, N. J., a copartnership Application May 14, 1943, Serial No. 486,982

6 Claims. (Cl. 198—209)

1

The present invention relates to a machine for cleaning, washing, rinsing, drying or otherwise treating articles in successive stages while said articles are being conveyed. The invention is an improvement on the general type of article treating machine disclosed in copending application Serial No. 361,211, filed October 15, 1940, and although it has a wide range of utility, it is particularly adapted for use in washing, drying or otherwise treating articles. In this general type of machine, while the articles are being conveyed on a rotary support through a chamber, they are subjected to liquids, gases or other treating operations in successive stages.

One object of the present invention is to provide a new and improved rotary conveyor system for a machine of the general character referred to.

Another object is to provide a rotary conveyor table sectionally constructed to permit its easy cleaning, assembly, repair or replacement.

A further object is to provide new and improved means for supporting and guiding a conveyor table for rotary movement against the thrust action of the table driving means.

Another object is to provide a new and improved drive transmission for a rotary conveyor table.

A further object is to provide a treating apparatus of the general character referred to having adjoining loading and discharge stations, and having means protectively separating said stations to prevent the articles emerging into said discharge station from being contaminated with treating fluids coming from the direction of said loading station.

Various other objects of the invention will be apparent from the following particular description, and from an inspection of the accompanying drawings, in which Fig. 1 is a top plan view somewhat diagrammatic of a machine embodying the present invention, and shown enclosed in a casing, the outline of which is indicated in dot and dash lines;

Fig. 3 is a section taken on line 3—3 of Fig. 1;

Fig. 4 is a section taken on line 4—4 of Fig. 3;

Fig. 5 is a fragmentary side elevation of a portion of the transmission means for driving the rotary table;

Figure 1:
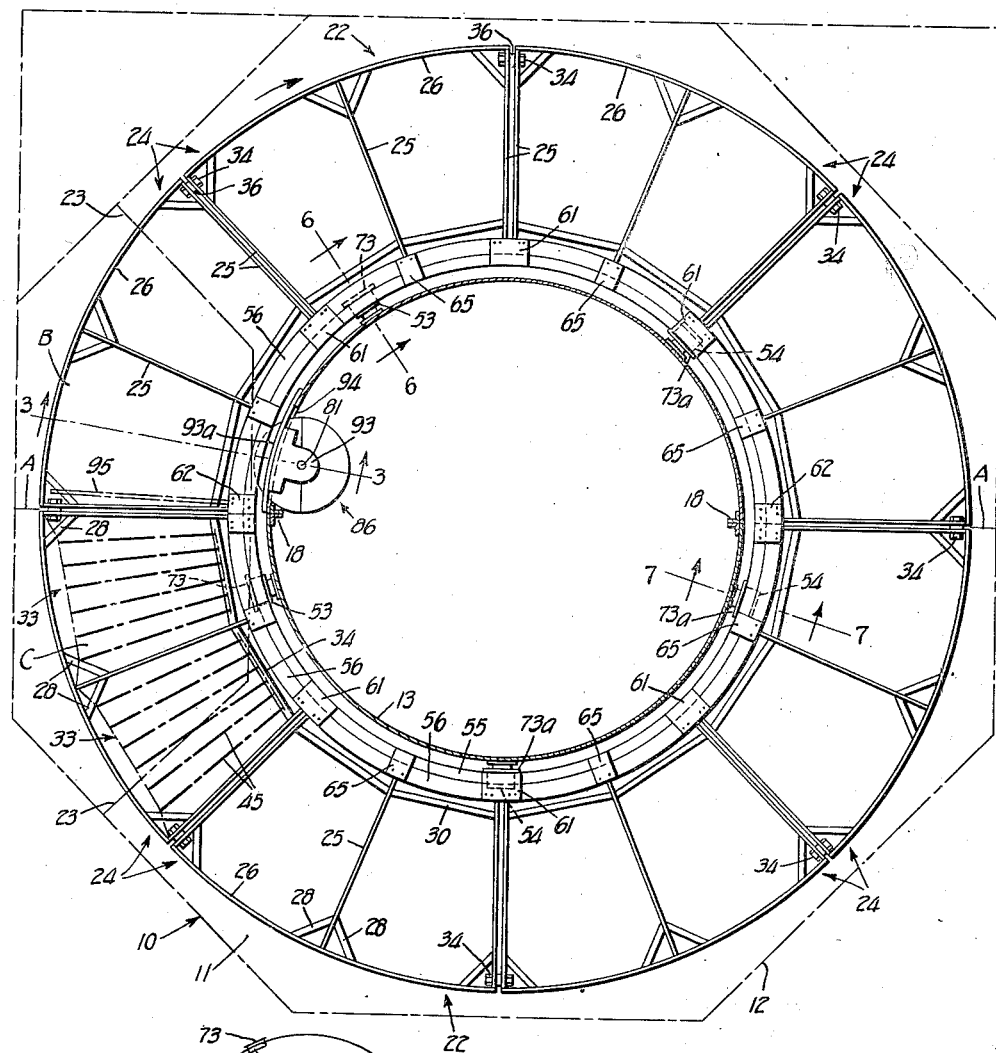

Figs. 6 and 7 are sections taken on lines 6—6 and 7—7 of Fig. 1 respectively;

Fig. 8 is a detailed radial section taken on line 8—8 of Fig. 10 but with the parts assembled;

Fig. 9 is a section similar to that of Fig. 8, but showing the parts separated and prior to assembly; and Fig. 10 is a fragmentary top plan view of the frame for the rotary table, parts of the apparatus

2 attached thereto being shown separated therefrom.

The invention is shown for example in connection with an apparatus which can be employed for cleaning various types of articles and which comprises a casing 10 (Fig. 1) defining an annular treating chamber 11 in which articles may be treated in successive stages while they are being carried therethrough. For example, the articles may be subjected to an alkali wash by means of sprays, rinsed to remove the adhering alkali solution, doused with hot soluble oil rinse, subjected to blasts of hot air to remove all excessive moisture, and cooled by air blast to permit the articles to be removed by hand. The different devices for carrying out these cycles of operations form per se no part of the present invention, and may be of any suitable construction. Some of these devices may for example be similar to those shown in the aforesaid application Serial No. 361,211.

The casing 10 (Figs. 1 and 3) includes an outer peripheral wall 12 and an inner cylindrical wall 13 defining therebetween the annular treating chamber 11, and connected to a suitable supporting structure 14 desirably by welding. These casing walls 12 and 13 are rigidly connected together as for example by plates 15 and 16 welded to said walls, the upper plate 15 being shown inclined downwardly in a radially inward direction to drain the processing liquids employed in the treating chamber 11. The casing 10 with its intermediate plates 15 and 16 is split in half along the plane A, and the two casing sections are detachably secured together by suitable means, as for example bolted angle bar connections 19 (Fig. 1).

A conveyor 22 in the form of an annular horizontal table is supported and rotated in the treating chamber 11, and serves to carry the articles through the different successive treating zones in said chamber. The casing 10 is formed with an opening 23 (Fig. 1) exposing a section of the rotary table 22. The exposed section of the rotary table 22 defines a loading station B on which the articles to be treated are deposited and an adjoining discharge station C from which the treated articles are removed. With adjoining loading and discharge stations, the same operator can handle both loading and discharge operations.

The rotary table 22 comprises a plurality of annular segments constructed to permit their easy assembly into a structurally rigid unit, or to permit their disassembly for repair, replacement or cleaning purposes. In the specific form shown, the rotary table 22 comprises a series of similar segmental frame units 24 (Figs. 1, 3 and 10) each comprising three circumferentially spaced radial plate bars 25 interconnected at their radially outer ends by a circular segment rim 26, and at their radially inner ends by a circular segment rim 27. At its radially outer end, the frame unit 24 is reinforced by braces 28 shown as tubes extending diagonally between each radial frame bar 25 and the outer segment rim 26. Near its radially inner end the frame unit 24 is reinforced by cross-braces 30 shown as tubes extending chordally between adjoining radial frame bars 25. The frame elements 25, 26, 27, 28 and 30 are desirably interconnected into a strong unit by welding to facilitate cleaning, to conform with the strictest sanitary requirements, and to form a light, strong, rigid unit, although as far as certain aspects of the invention are concerned, these frame elements may be interconnected in any other way, as for instance by bolting. The frame unit 24 as described, defines a pair of adjoining open border structures in each of which is seated an openwork shelf 33 (Figs. 1, 3 and 4) desirably in the form of a grate.

The segmental frame units 24 are detachably joined together near their radially outer ends, as for example by bolts 34 (Figs. 1, 4 and 10), passing through the adjacent radial bars 25 of adjoining frame units 24, and separated by washers or collars 36. At their radially inner ends, the segmental frame units 24 are detachably joined by a table drive structure to be hereinafter described.

The table frame is split diametrically into two halves along the plane A in a manner to be hereinafter more fully described. Each of these table halves is shown consisting of four interconnected frame units 24. These two table frame halves are detachably held at their radially inner ends against relative displacement desirably by means of a pair of dowel pins 37 (Figs. 4, 5, 8 and 10), secured to respective blocks 38 as for example by welding to the inner peripheral surface of the inner rim 27 of one frame half and extending into the pin retaining holes of respective blocks 40, secured as for example by welding to the inner peripheral surface of the inner rim 27 of the other frame half.

The rotary table frame assembled into a rigid unit as described, carries the grates 33 in each of the sixteen frame openings shown. Each of these grates 33 (Figs. 1 and 4) comprises a plurality of radial bars 45 shown in the form of tubes preferably welded at their radially inner ends to a cross-bar 46, and at their radially outer ends to a cross-bar 47. The end sections 48 of the cross-bar 47 are offset radially outwardly from its intermediate section 50, so that these end sections extend into the corners formed between the frame elements 25 and 26, and are retained in said corners against radially inward slide movement by the radially inwardly converging frame bars 25, and are retained against radially outward movement by the outer frame rim 26. The grate 33 is supported at its radially outer end by the seating of the end sections 48 of the grate cross-bar 46 on respective diagonal frame braces 28, and is supported at its radially inner end by the seating of the grate cross-bar 46 on and along respective cross frame braces 30. By means of this construction, the grates 33 may be easily dropped in position in their respective frame openings, or can be just as easily lifted therefrom.

The open work structure of the rotary table 22 formed by the interconnected frame units 24 and the grates 33 permits circulation of the processing fluids through the table and around the articles resting on said table.

To support and guide the table 22 for rotary movement, there is provided an annular track 55, shown in the form of a channel detachably connected to the inner periphery of the frame structures 24, and supported on guide rollers 53 and 54. To provide a detachable connection between the track 55 and the table frame, each of the segmental frame structures 24 has a horizontal circular plate segment 56 secured to the upper edge of the inner rim 27 as for example by welding as shown in Figs. 8, 9 and 10, so that said plate segment 56 has its two side sections projecting radially beyond both faces of said rim 27. Plates 59 (Figs. 8 and 10) between the radial frame bars 25 and the plate segments 56 are welded to said members and to the inner rim 27 to reinforce the structural tie-up of these members 25, 27 and 56.

Connected as for example by welding to the radially inner surface of the inner rim 27 is a circular bar 60, which in conjunction with the radially inwardly projecting section of the plate segment 56 affords an effective backing for the web of the channel track 55. This track 55 is detachably secured to the frame units 24 by means of tie plates 61 rigid with the top flange of the track 55 desirably by welding, and each bolted to the radially outer sections of the plate segments 56 of adjoining frame units 24, so that said tie plates 61 serve not only to detachably connect the track 55 to these frame units 24, but also serve to interconnect these frame units together at their radially inner ends.

At the section A where the table 22 is diametrically split, the track 55 is similarly diametrically split, and the two halves of said track are detachably connected together and to the radially outer sections of the plate segments 56 of the two frame halves by means of tie plates 62. These tie plates 62 are shown secured to the track 55 by screws 63, and to the plate segments 56 by bolts 64, and serve to rigidly interconnect the two halves of the rotary frame units 24 as well as the two halves of the track 55 together, and also serve to rigidly connect the track 55 and the rotary frame together into a rigid structural unit. If desired, additional tie plates 65 may be employed intermediate the tie plates 61 and 62. These additional tie plates 65 may be welded to the track 55 and bolted to the segment 56.

Each of the casing half sections forms a unit with the corresponding half of the rotary table 22 and the track 55, so that each half of the apparatus can be completely assembled, and then the two halves detachably joined together as described.

The guide rollers 53 and 54 are constructed and arranged to floatingly support the track 55 and hold it centrally against the outward radial component at the thrust of the table sprocket and chain drive 85 and 87 to be described, while permitting enough limited play between the sprocket wheel 85 and said track to reduce stress on the drive elements 85 and 87 to a minimum. For that purpose, the guide rollers 53, two of which are shown in Fig. 1, support and guide the half of the track 55 extending approximately centrally from opposite sides of the table driving means 85 and 87, while the guide rollers 54, three of which are shown, support and guide the other half of the track. These rollers 53 and 54 have flanges at one end only, and are arranged so that these flanges resist the radial thrust on the track 55 and confine said track against movement in the direction of said thrust, while permitting limited movement of said track in the opposite direction.

Each of the guide rollers 53 is supported as shown in Figs. 1 and 6 on the inner peripheral casing wall 13, as for example by means of a bracket plate 70 secured to said casing wall by bolts 71, and carrying an axle 72 welded or otherwise made rigid with said bracket plate. Supported on this axle 72 for free rotation thereabout, is a guide roller 53.

The radial thrust of the driving means 85 and 87 on the track 55 is in a direction substantially to the left as viewed in Figs. 1 and 6. To resist this radial thrust, and at the same time permit the track 55 to be displaced slightly in a direction opposite to the direction of this radial thrust, each of the rollers 53 is provided only at one end with a peripheral flange 73 abutting the outer periphery of the track 55. The roller 53 is retained on the axle 72 against the action of this radial thrust by means of a plate 74 secured to the end of the axle 72, as for example by the screws 75, and bearing against the hub of the roller 53.

Each of the rollers 54 is rotatably supported on an axle 72a (Fig. 7) fixed to a bracket 70a bolted to the inner casing wall 13 by the bolts 71a as in the construction of Fig. 6. The roller 54 is provided only at one end with a peripheral flange 73a, and is arranged so that said flange engages the inner periphery of the track 55 to resist the radial thrust on said track. Since the thrusts on the rollers 54 are in radially inward directions against the casing wall 13, no means need be provided to prevent these rollers from slipping off their respective axles 72a.

By providing each of the rollers 53 and 54 with only one guide flange, a lighter and simpler construction is afforded. Furthermore, this construction serves to floatingly support the track 55 and in turn the rotary table 22, and thereby serves to reduce stress on the drive elements 85 and 87 to a minimum. This floating support of the track 55 is desirable, especially where the drive elements 85 and 87 consist of a sprocket wheel and chain as in the present construction.

Figure 2:
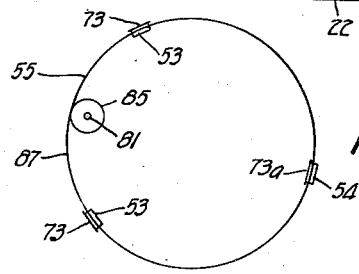
Fig. 2 is a schematic top plan view showing the rotary conveyor table of Fig. 1, but supported and guided in an alternative manner.

In Fig. 1 is shown two rollers 53 arranged along one half of the track 55 and three rollers 54 arranged along the other half. In Fig. 2 is shown diagrammatically an alternative form in which two rollers 53 are arranged along one half of the track 55 on opposite sides of the table drive elements 85 and 87, and only one roller 54 centrally arranged on the other half of the track 55.

The means for driving the table 22 comprises a motor 80 (Fig. 3), which drives a shaft 81 through a suitable reduction gearing 82. This shaft 81 drives a toothed wheel 85 through a slip or friction clutch 86, which is of any suitable construction, such as that shown in copending application Serial No. 404,126, and which is mounted directly above said wheel. This toothed wheel is secured to an adapter ring 86a by means of screws 86b and the adapter ring 86a is in turn secured to the drum or casing 86c by means of screws 86d. Suitable friction shoes (not shown) are arranged within the drum 86c and are connected to the shaft 81 and are caused to engage the inner face of the drum 86c to drive the latter and the gear 85. The gear 85 meshes with an annular cog member or ring 87 (Figs. 3, 4, 5, 8 and 9), secured in the annular channel of the track 55, and thereby serves to rotate said track and in turn the rotary table 22. In case the rotation of the table 22 is accidentally interfered with, which may occur due to one or more articles being conveyed thereby becoming disarranged and striking some obstruction, the drum 86c slips relatively to the shoes therein thus permitting the table to stop while the shaft 81 continues to rotate. From the foregoing, it will be understood that no damage to the machine can occur in case the table is accidentally stopped.

As a feature of the present invention, the drive elements 85 and 87 are not of the ordinary annular gear and pinion type, but are of the drive chain type with the element 85 in the form of a sprocket wheel, and the cog ring 87 in the form of a drive chain. This construction is less expensive and more rugged than the ordinary annular gear and pinion drive, and permits the heat treatment of certain separable parts in the manufacture of the drive chain, while other parts are left untreated. In the form shown, the drive chain 87 comprises a plurality of links interconnected by intermediate articulating joint structures which drivingly engage the sprocket teeth and cause the rotation of the chain. In the form shown, the drive chain 87 includes two strands of links 90 overlapping end to end and pivotally interconnected by means of pintles 91. These pintles 91 extend through bushings 91a secured at opposite ends to the links 90 of the link strands. On each bushing is supported a sleeve or roller 92, these serving as the cogs of the chain. The links 90 are made rigid with the inner face of the channel of the track 55 desirably by welding, so that they form a rigid unit therewith, and the cog sleeves 92 are desirably case-hardened to better withstand the driving wear. The chain 87 with its many assembled parts permits these parts to be made of different structural characteristics. For instance, while the cog sleeves 92 are case-hardened before assembly, the links 90 need not be so treated, and may be of forged untreated construction tough enough to withstand the drive stresses imposed by the sprocket wheel 85.

In the plane A at the two sections where the machine is diametrically split, the drive chain 87 does not have a pintle as shown in Fig. 5, and the overlapping ends of the links 90 at this section A are held against relative endwise displacement by the tie plates 62. This construction facilitates assembly of the two halves of the track 55 and the two corresponding halves of the chain 87 rigid therewith.

Due to the fact that the track 55 is channel shaped in cross-section the chain 87, which forms an internal gear, is located in the channel of said track, thus providing a compact structure including a combined track and internal gear which occupies a minimum of space. Such a degree of compactness would not be possible if the internal gear were formed by cutting its teeth since the gear would have to extend from the track and beyond the vertical plane in which the free edges of the upper and lower flanges of the track are located a sufficient distance to permit cutting of the gear teeth.

The drive shaft 81 extends upwardly through the plate of the supporting structure 14 which plate has the reduction gear unit 82 secured thereto. The upper end of the shaft 81 is guided by a bracket 93 secured to a bar 93a secured to the inner wall 13. The bar 93a extends across an opening 94 (Figs. 1 and 3) formed in the wall 13, through which a portion of the clutch extends and through which opening access may be had to the clutch for convenience in assembling and adjusting. The clutch is provided with a cover 93b which is diametrically split for the purpose of attachment or removal. The motor 80, gear reduction unit 82, clutch 86 and gear 85 are supported to one side of the line of division A of the machine so as to be supported entirely by one half of the machine.

To prevent the processing liquid coming from the direction of the loading station B from splashing on the treated article converging on the discharge station C, there is provided a curtain 95 (Figs. 1 and 3) which is suspended from a radial rod 96 secured to the casing 10. This curtain 95 is disposed to separate and partition the loading station B from the discharge station C and comprises a series of strips 97 overlapping at their sides and made of any suitable material.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

We have described what we believe to be the best embodiments of our invention. We do not wish, however, to be confined to the embodiments shown, but what we desire to cover by Letters Patent is set forth in the appended claims.

We claim:

1. In combination, an annular rotary table, a circular track of channel section connected to the inner periphery of said table to form a rotatable unit therewith and having radially extending flanges, roller supports adapted to engage the lower flange of said track, an annular drive chain rigidly connected to said track between the radially extending flanges and throughout the length of said chain to form a rotatable unit with said track, and a sprocket wheel meshing with said chain, whereby said track serves also as a support for the drive chain.

2. In a treating apparatus, an annular rotary table comprising a table frame structure having an outer circular rim and an inner circular rim, a series of circumferentially spaced radially extending arms between said rims defining a series of circumferentially adjoining openings, and grates seated on said frame structure in the respective openings, and each grate having an outer bar extending substantially chordally across said outer rim and having its end sections extending into the respective corners formed between the outer rim and said radial bars whereby to retain the grate in the opening against radial movement, and braces between the radial arms for supporting the grates.

3. In a treating apparatus, an annular rotary table comprising a table frame structure having an outer rim and an inner rim, a series of circumferentially spaced radially extending arms between said rims defining a series of circumferentially adjoining openings, outer braces across the corners between said radial arms and said outer rim, inner braces between adjacent radial arms, grates in the respective openings and supported on the inner and outer braces, each grate having a series of radial bars and a cross-bar near each end, the outer cross-bar having end sections seated on said outer braces and extending into said corners to retain the grate in the opening against radial movement.

4. In a treating apparatus, a rotary annular table, an annular track secured to the inner peripheral section of said table and having a flat radially extending bearing surface, three or more rollers flanged only at one end engaging the bearing surface for supporting and guiding said track, and drive means partly carried by the track for rotating said track, said drive means imparting to said track a thrust having a radially outward component, said rollers being arranged circumferentially around said track with one or more of the roller flanges engaging the outer periphery of said track, and the other roller flange or flanges engaging the inner periphery of said track, whereby all of said rollers resist said radial thrust, while permitting limited movement of said track in a direction opposite to the direction of said radial thrust component.

5. In a treating apparatus, a rotary annular table, an annular track secured to the inner peripheral section of said table and having a flat radially extending bearing surface, three or more rollers flanged only at one end engaging the bearing surface for supporting and guiding said track, a drive chain carried by said track and rigidly secured along its entire length to said track, a sprocket drive wheel meshing with said chain to rotate said table, and imparting to said table a thrust having a radially outward component, said rollers being arranged circumferentially around said track with one or more of the roller flanges engaging the outer periphery of said track to resist said radial thrust, and the other roller flange or flanges engaging the inner periphery of said track to assist in resisting said radial thrust, said rollers permitting said track limited displacement in a direction opposite to the direction of said radial thrust.

6. In a treating apparatus, a rotary annular table, an annular track of channel section secured to the inner peripheral section of said table and having flat radially extending flanges, a drive chain rigidly secured to the track along its entire length with said track and between the radially extending flanges, a sprocket drive wheel meshing with said chain to rotate said table, and roller means engaging the lower flange for guiding and supporting said track against the radial thrust action of said sprocket wheel on said track while permitting said track limited movement in a direction opposite to the direction of said thrust action.

ERICH R. ZADEMACH.
WILLIAM W. CLARKE.

REFERENCES CITED

The following references are of record in the file of this patent:

UNITED STATES PATENTS

| Number | Name | Date |
|---|---|---|
| 1,862,485 | McEwan | June 7, 1932 |
| 1,908,526 | McEwan | May 9, 1933 |
| 1,716,406 | Wolf | June 11, 1929 |
| 1,831,388 | Hippenmeyer | Nov. 10, 1931 |
| 1,653,219 | Lathrop | Dec. 20, 1927 |
| 1,159,486 | Froelich | Nov. 9, 1915 |
| 396,649 | Davidson | Jan. 22, 1889 |
| 1,553,428 | Benn | Sept. 15, 1925 |
| 1,699,538 | Keller et al. | Jan. 22, 1929 |
| 1,884,052 | McEwan | Oct. 25, 1932 |

FOREIGN PATENTS

| Number | Country | Date |
|---|---|---|
| 505,433 | French | May 6, 1920 |
| 8,963 | British | |